(12) United States Patent
Lin et al.

(10) Patent No.: US 11,215,752 B1
(45) Date of Patent: Jan. 4, 2022

(54) ELECTRONIC DEVICES WITH IMAGE TRANSPORT LAYERS

(71) Applicant: Apple Inc., Cupertino, CA (US)

(72) Inventors: Wei Lin, Santa Clara, CA (US); Di Liu, San Jose, CA (US); Chunchia Huang, Santa Clara, CA (US); Nathan K. Gupta, San Francisco, CA (US); Prabhakar Gulgunje, Cupertino, CA (US); Shenglin Ye, Santa Clara, CA (US); Shubhaditya Majumdar, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/112,147

(22) Filed: Dec. 4, 2020

Related U.S. Application Data

(60) Provisional application No. 62/948,128, filed on Dec. 13, 2019.

(51) Int. Cl.
*G02B 6/08* (2006.01)
*G02B 6/02* (2006.01)

(52) U.S. Cl.
CPC ........... *G02B 6/08* (2013.01); *G02B 6/02295* (2013.01)

(58) Field of Classification Search
None
See application file for complete search history.

(56) References Cited

U.S. PATENT DOCUMENTS

| | | | |
|---|---|---|---|
| 7,406,239 B2 * | 7/2008 | Ouderkirk | B82Y 20/00 385/123 |
| 7,910,207 B2 | 3/2011 | Kamiyama et al. | |
| 8,513,147 B2 | 8/2013 | Gupta et al. | |
| 9,274,369 B1 | 3/2016 | Lee et al. | |
| 9,447,524 B2 | 9/2016 | Masuda et al. | |
| 9,863,920 B2 * | 1/2018 | Gaynor | G01N 21/73 |
| 10,223,952 B2 | 3/2019 | Powell et al. | |
| 10,579,157 B1 | 3/2020 | Wilson | |
| 10,620,365 B2 | 4/2020 | Dawson | |
| 2005/0243415 A1 | 11/2005 | Lowe et al. | |
| 2006/0209029 A1 | 9/2006 | Gutbrod et al. | |
| 2010/0073328 A1 | 3/2010 | Lynch et al. | |
| 2012/0190928 A1 | 7/2012 | Boudoux et al. | |
| 2014/0016071 A1 | 1/2014 | Yang et al. | |

(Continued)

*Primary Examiner* — Jerry Rahll
(74) *Attorney, Agent, or Firm* — Treyz Law Group, P.C.; G. Victor Treyz; Tianyi He

(57) ABSTRACT

An electronic device may have a housing with a display. A protective display cover layer for the display may have an image transport layer such as an image transport layer formed from optical fibers. Extruded filaments of binder material may be fused together to form a layer of binder for the image transport layer. Each filament may contain multiple embedded optical fibers. As a result of the extrusion process, the optical fibers may be characterized by increasing lateral deformation at increasing distances from the center of the filament in which the optical fibers are embedded. Tension variations and variations in the orientation angle of the fibers in the image transport layer can be maintained below desired limits to ensure satisfactory optical performance for the image transport layer. The optical fibers and binder may be formed from polymers or other clear materials.

21 Claims, 7 Drawing Sheets

(56) References Cited

U.S. PATENT DOCUMENTS

| | | | |
|---|---|---|---|
| 2014/0218956 A1* | 8/2014 | Wu | G09F 9/35 362/554 |
| 2014/0218961 A1* | 8/2014 | Wu | G02B 6/08 362/559 |
| 2015/0092395 A1* | 4/2015 | Wu | G02B 6/0061 362/97.1 |
| 2015/0092442 A1* | 4/2015 | Wu | G02B 6/0061 362/608 |
| 2015/0093086 A1* | 4/2015 | Wu | G02B 6/08 385/132 |
| 2017/0094814 A1* | 3/2017 | Chin | G02B 6/00 |
| 2017/0094815 A1* | 3/2017 | Chin | G02B 6/08 |
| 2017/0139131 A1 | 5/2017 | Karafin et al. | |
| 2018/0128973 A1 | 5/2018 | Powell et al. | |
| 2019/0391326 A1 | 12/2019 | Yang et al. | |

* cited by examiner

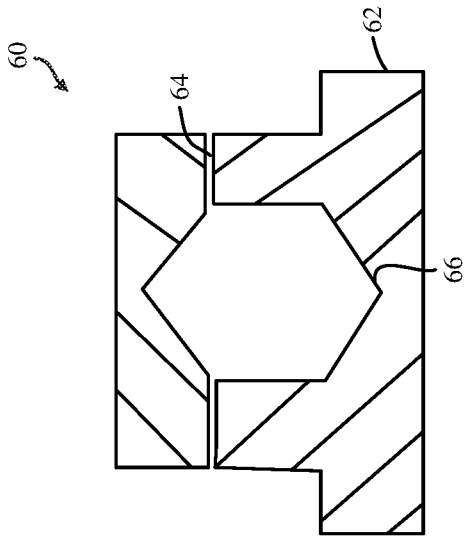
FIG. 4
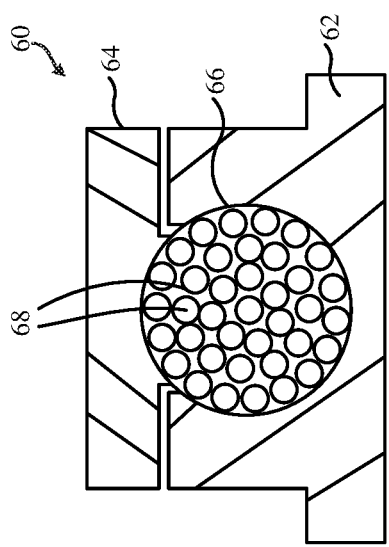
FIG. 5
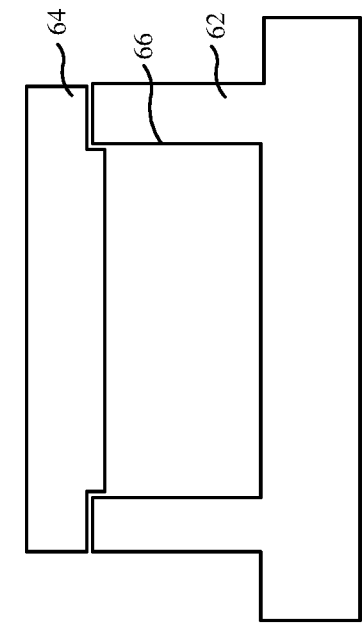
FIG. 6
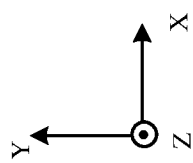

ELECTRONIC DEVICES WITH IMAGE TRANSPORT LAYERS

This application claims the benefit of provisional patent application No. 62/948,128, filed Dec. 13, 2019, which is hereby incorporated by reference herein in its entirety.

FIELD

This relates generally to electronic devices, and, more particularly, to optical structures for electronic devices.

BACKGROUND

Electronic devices may have displays. Displays have arrays of pixels for displaying images for a user. To prevent damage to the pixels, the pixels can be covered with a transparent display cover layer. If care is not taken, however, the inclusion of a display cover layer into an electronic device may cause the device to have larger inactive border regions than desired or may introduce undesired image distortion.

SUMMARY

An electronic device may have a housing. Electrical components may be mounted on printed circuits and other substrates in interior portions of the housing. A display in the housing may be covered by a protective display cover layer. To help enlarge the effective size of the display, the display cover layer may be formed from an image transport layer. The image transport layer may include a coherent fiber bundle. During operation, images presented to an inner input surface of the image transport layer are transported to and presented on a corresponding outer output surface of the image transport layer.

The coherent fiber bundle may be formed from elongated strands of binder material. In an illustrative configuration, extruded filaments of binder material containing optical fibers are fused together to form a layer of optical fibers joined by binder. Prior to fusing, each extruded filament may contain multiple embedded optical fibers. The optical fibers may each have an optical fiber core surrounded by a cladding.

The optical fibers in a filament may become deformed during the extrusion process. These optical fibers may be characterized by increasing lateral deformation (cross-sectional shape deformation away from an ideal circular shape) at increasing distances from the center of the filament in which the optical fibers are embedded. During assembly and fusion of the filaments to form and image transport layer, tension variations and variations in the orientation angle of the filaments and fibers in the image transport layer can be maintained below desired limits. This helps to ensure satisfactory optical performance for the image transport layer. The optical fibers and binder may be formed from polymers or other clear materials.

BRIEF DESCRIPTION OF THE DRAWINGS

FIGS. 4, 5, and 6 are cross-sectional views of illustrative fusing tools for fusing extruded filaments together at a fusion temperature in accordance with embodiments.

DETAILED DESCRIPTION

An electronic device may have a display. The display may have an array of pixels for creating an image. The image may pass through a protective display cover layer that overlaps the array of pixels. It may be desirable to expand image size and/or to otherwise optically modify an image presented on the array of pixels. This can be accomplished using an image transport layer. For example, to minimize display borders, the display cover layer may include an image transport layer formed from Anderson localization material or a coherent fiber bundle. The image transport layer may receive an image from a display at an input surface and may provide the image to a corresponding output surface for viewing by a user. The image transport layer may have a shape that helps expand the effective size of the image without imparting undesired distortion to the image and/or may have other configurations.

Figure 1:
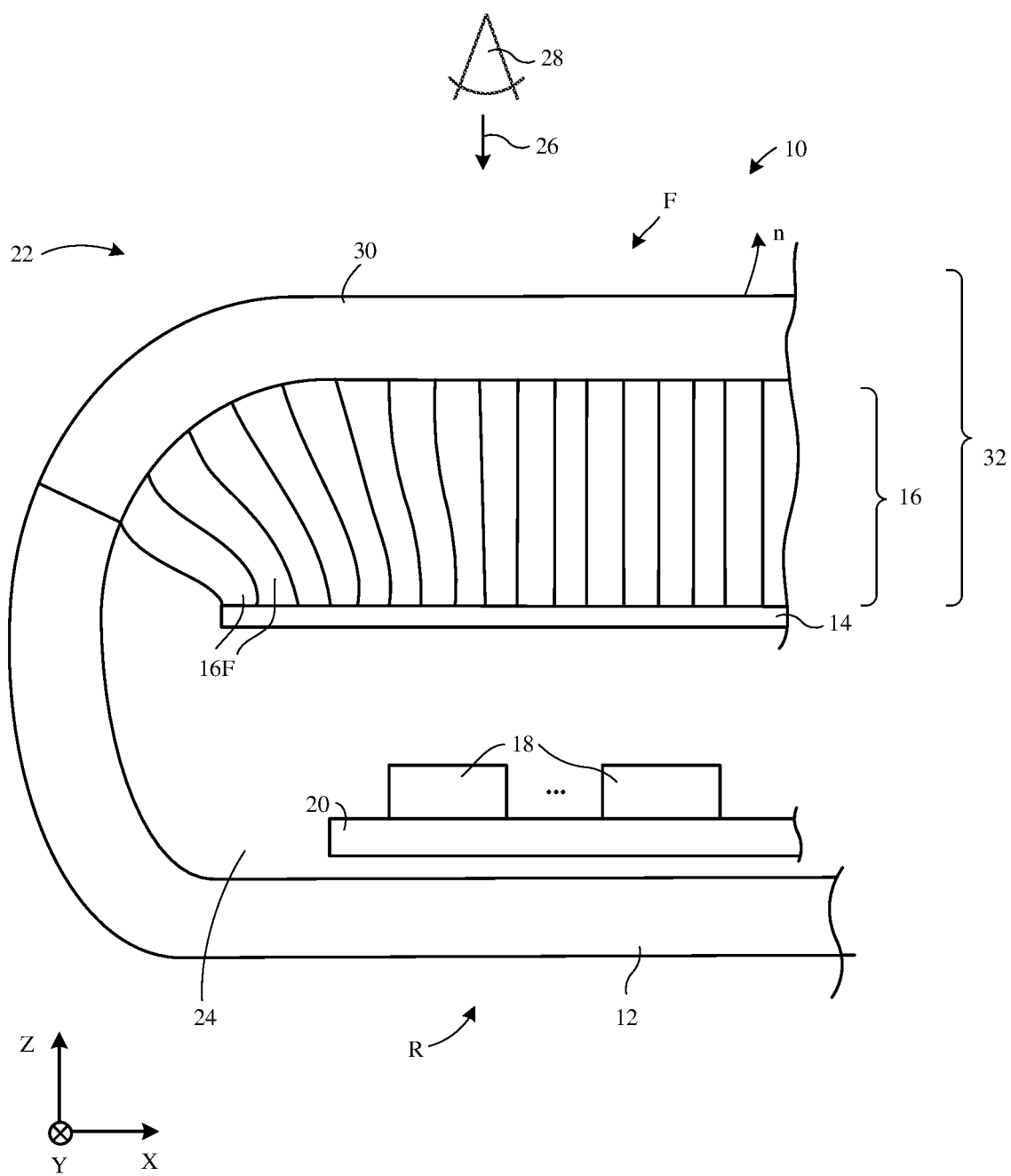
FIG. 1 is a side view of an illustrative electronic device with an image transport layer overlapping a display in accordance with an embodiment.

A cross-sectional side view of a portion of an illustrative electronic device with a display cover layer that includes an image transport layer is shown in FIG. 1. In the example of FIG. 1, device 10 is a portable device such as a cellular telephone, wristwatch, or tablet computer. In general, any type of electronic device may have an image transport layer such as a desktop computer, a voice-control speaker, a television or other non-portable display, a head-mounted device, an embedded system such as a system built into a vehicle or home, an electronic device accessory, and/or other electronic equipment.

Device 10 includes a housing such as housing 12. Housing 12 may be formed from polymer, metal, glass, crystalline material such as sapphire, ceramic, fabric, fibers, fiber composite material, natural materials such as wood and cotton, other materials, and/or combinations of such materials. Housing 12 may be configured to form housing walls. The housing walls may enclose one or more interior regions such as interior region 24 and may separate interior region 24 from exterior region 22. In some configurations, an opening may be formed in housing 12 for a data port, for a power port, to accommodate audio components, or to accommodate other devices. Clear housing regions may be used to form optical component windows. Dielectric housing structures may be used to form radio-transparent areas for antennas and wireless power components.

Electrical components 18 may be mounted in interior region 24. Electrical components 18 may include integrated circuits, discrete components, light-emitting components, sensors, and/or other circuits and may, if desired, be interconnected using signal paths in one or more printed circuits such as printed circuit 20. If desired, one or more portions of the housing walls may be transparent (e.g., so that light associated with an image on a display or other light-emitting or light-detecting component can pass between interior region 24 and exterior region 22).

Electrical components 18 may include control circuitry. The control circuitry may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in the control circuitry may be used to control the operation of device 10. For example, the processing circuitry may use sensors and other input-output circuitry to gather input and to provide output and/or to transmit signals to external equipment. The processing circuitry may be based on one or more microprocessors, microcontrollers, digital signal processors, baseband processors, power management units, audio chips, application specific integrated circuits, etc. The control circuitry may include wired and/or wireless communications circuitry (e.g., antennas and associated radio-frequency transceiver circuitry such as cellular telephone communications circuitry, wireless local area network communications circuitry, etc.). The communications circuitry of the control circuitry may allow device 10 to communicate with other electronic devices. For example, the control circuitry (e.g., communications circuitry in the control circuitry) may be used to allow wired and/or wireless control commands and other communications to be conveyed between devices such as cellular telephones, tablet computers, laptop computers, desktop computers, head-mounted devices, handheld controllers, wristwatch devices, other wearable devices, keyboards, computer mice, remote controls, speakers, accessory displays, accessory cameras, and/or other electronic devices. Wireless communications circuitry may, for example, wirelessly transmit control signals and other information to external equipment in response to receiving user input or other input from sensors or other devices in components 18.

Input-output circuitry in components 18 of device 10 may be used to allow data to be supplied to device 10 and to allow data to be provided from device 10 to external devices. The input-output circuitry may include input devices that gather user input and other input and may include output devices that supply visual output, audible output, or other output.

Output may be provided using light-emitting diodes (e.g., crystalline semiconductor light-emitting diodes for status indicators and/or displays, organic light-emitting diodes in displays and other components), lasers, and other light-emitting devices, audio output devices (e.g., tone generators and/or speakers), haptic output devices (e.g., vibrators, electromagnetic actuators, piezoelectric actuators, and/or other equipment that supplies a user with haptic output), and other output devices.

The input-output circuitry of device 10 (e.g., the input-output circuitry of components 18) may include sensors. Sensors for device 10 may include force sensors (e.g., strain gauges, capacitive force sensors, resistive force sensors, etc.), audio sensors such as microphones, touch and/or proximity sensors such as capacitive sensors (e.g., a two-dimensional capacitive touch sensor integrated into a display, a two-dimensional capacitive touch sensor and/or a two-dimensional force sensor overlapping a display, and/or a touch sensor or force sensor that forms a button, trackpad, or other input device not associated with a display), and other sensors. Touch sensors for a display or for other touch components may be based on an array of capacitive touch sensor electrodes, acoustic touch sensor structures, resistive touch components, force-based touch sensor structures, a light-based touch sensor, or other suitable touch sensor arrangements. If desired, a display may have a force sensor for gathering force input (e.g., a two-dimensional force sensor may be used in gathering force input on a display).

If desired, the sensors may include optical sensors such as optical sensors that emit and detect light, optical touch sensors, optical proximity sensors, and/or other touch sensors and/or proximity sensors, monochromatic and color ambient light sensors, image sensors, fingerprint sensors, ultrasonic sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors, radio-frequency sensors (e.g., sensors that gather position information, three-dimensional radio-frequency images, and/or other information using radar principals or other radio-frequency sensing), depth sensors (e.g., structured light sensors and/or depth sensors based on stereo imaging devices), optical sensors such as self-mixing sensors and light detection and ranging (lidar) sensors that gather time-of-flight measurements, humidity sensors, moisture sensors, gaze tracking sensors, three-dimensional sensors (e.g., time-of-flight image sensors, pairs of two-dimensional image sensors that gather three-dimensional images using binocular vision, three-dimensional structured light sensors that emit an array of infrared light beams or other structured light using arrays of lasers or other light emitters and associated optical components and that capture images of the spots created as the beams illuminate target objects, and/or other three-dimensional image sensors), facial recognition sensors based on three-dimensional image sensors, and/or other sensors.

In some configurations, components 18 may include mechanical devices for gathering input (e.g., buttons, joysticks, scrolling wheels, key pads with movable keys, keyboards with movable keys, and other devices for gathering user input). During operation, device 10 may use sensors and/or other input-output devices in components 18 to gather user input (e.g., buttons may be used to gather button press input, touch and/or force sensors overlapping displays can be used for gathering user touch screen input and/or force input, touch pads and/or force sensors may be used in gathering touch and/or force input, microphones may be used for gathering audio input, etc.). The control circuitry of device 10 can then take action based on this gathered information (e.g., by transmitting the information over a wired or wireless path to external equipment, by supplying a user with output using a haptic output device, visual output device, an audio component, or other input-output device in housing 12, etc.).

If desired, electronic device 10 may include a battery or other energy storage device, connector ports for supporting wired communications with ancillary equipment and for receiving wired power, and other circuitry. In some configurations, device 10 may serve as an accessory and/or may include a wired and/or wireless accessory (e.g., a keyboard, computer mouse, remote control, trackpad, etc.).

Device 10 may include one or more displays such as display 14. The displays may, for example, include an organic light-emitting diode display, a liquid crystal display, a display having an array of pixels formed from respective light-emitting diodes (e.g., a pixel array having pixels with crystalline light-emitting diodes formed from respective light-emitting diode dies such as micro-light-emitting diode dies), and/or other displays. The displays may include rigid display structures and/or may be flexible displays. For example, a light-emitting diode display may have a polymer substrate that is sufficiently flexible to be bent. Display 14 may have a rectangular pixel array or a pixel array of another shape for displaying images for a user and may therefore sometimes be referred to as a pixel array. Display 14 may also sometimes be referred to as a display panel, display layer, or pixel layer. Each pixel array in device 10 may be mounted under a transparent housing structure (sometimes referred to as a transparent display cover layer).

In the example of FIG. 1, display (pixel array) 14 is mounted under display cover layer 32. Display cover layer 32 (which may be considered to form a portion of the housing of device 10), covers front face F of device 10. Configurations in which opposing rear face R of device 10 and/or sidewall portions of device 10 have transparent structures covering displays and other optical components may also be used.

As shown in FIG. 1, display cover layer 32 may include image transport layer 16 and protective layer 30. Protective layer 30 may be formed from a layer of glass, clear polymer, crystalline material such as sapphire or other crystalline material, and/or other transparent material. The presence of layer 30 may help protect the outer surface of layer 16 from scratches. If desired, layer 30 may be omitted (e.g., in configurations in which a thin-film protective coating is present on the outer surface of layer 16, in configurations in which layer 16 is formed from hard material such as glass, and/or in other configurations in which layer 16 is resistant to scratching). A layer of adhesive and/or other structures may be formed between protective layer 30 and image transport layer 16 and/or may be included elsewhere in the stack of layers on display 14.

During operation, the pixels of display 14 produce image light that passes through image transport layer 16. In configurations in which image transport layer 16 is formed from a coherent fiber bundle, image transport layer 16 has optical fibers 16F. The fibers or other optical structures of image transport layer structures such as image transport layer 16 transport light (e.g., image light and/or other light) from one surface (e.g., an input surface of layer 16 that faces display 14) to another (e.g., an output surface of layer 16 that faces viewer 28, who is viewing device 10 in direction 26). As the image presented to the input surface of layer 16 is transported to the output surface of layer 16, the integrity of the image light is preserved. This allows an image produced by an array of pixels to be transferred from an input surface of a first shape at a first location to an output surface with a different shape (e.g., a shape with a footprint that differs from that of the input surface, a shape with a curved cross-sectional profile, a shape with a region of compound curvature, and/or a shape with other desired features).

Image transport layer 16 may therefore move the location of an image and may optionally change the shape of the surface on which the image is presented. In effect, viewer 28 will view the image from display 14 as if the image were generated on the output surface of image transport layer 16. In arrangements in which the image from display 14 is warped (geometrically distorted) by image transport layer 16, digital pre-distortion techniques or other compensation techniques may be used to ensure that the final image viewed on the output surface of image transport layer 16 has a desired appearance. For example, the image on display 14 may be prewarped so that this prewarped image is warped by an equal and opposite amount upon passing through layer 16. In this way, the prewarped image is effectively unwarped by passage through layer 16 and will not appear distorted on the output surface.

In configurations of the type shown in FIG. 1, device 10 may have four peripheral edges and a rectangular footprint when viewed in direction 26 or may have other suitable shapes. To help minimize the size of inactive display borders as a user is viewing front face F of device 10 as shown in FIG. 1, the shapes of fibers 16F along the periphery of layer 16 may be deformed outwardly as shown in FIG. 1. These fibers 16F each have an outwardly bent segment that bends away from surface normal n of the center of layer 30 (e.g., away from an axis parallel to the Z axis of FIG. 1) and each have an inwardly bent segment that bends back towards surface normal n to help direct output light towards viewer 28.

The deformed shapes of fibers 16F (and/or the corresponding deformations made to optical filaments in Anderson localization material in layer 16) may help distribute image light laterally outwards in the X-Y plane so that the effective size of display 14 is enlarged and the image produced by display 14 covers some or all of the sidewalls of housing 12 or other peripheral portions of device 10 when the image on front face F is being viewed by viewer 28. For example, the bent shapes of fibers 16F of FIG. 1 may help shift portions of the displayed image laterally outward in the X-Y plane along the edges and corners of device 10 to block the edges of device 10 from view. In some arrangements, the portions of fibers 16F at the outermost surface of layer 16 are oriented parallel or nearly parallel with viewing direction 26 and the Z axis of FIG. 1, which helps ensure that some or all of the light that has passed through layer 16 will travel in the Z direction and be viewable by viewer 28.

Figure 2:
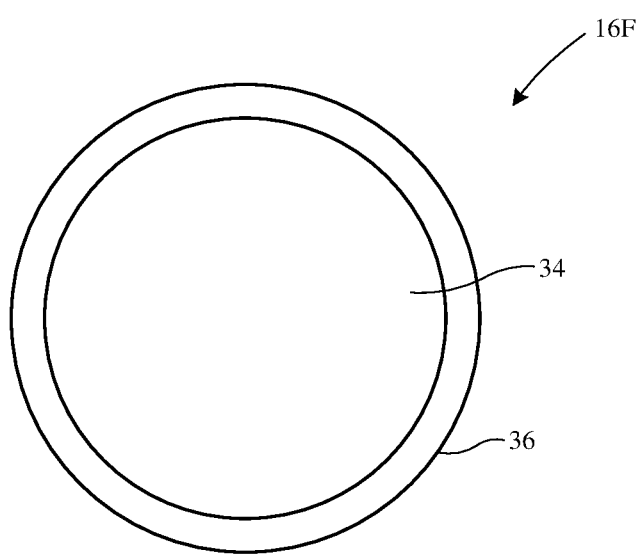
FIG. 2 is a cross-sectional view of an illustrative optical fiber in accordance with an embodiment.

In coherent fiber bundles, fibers 16F are joined together to form layer 16. A cross-sectional end view of an illustrative fiber 16F is shown in FIG. 2. As shown in FIG. 2, fiber 16F may have a transparent core 34 (sometimes referred to as an optical fiber core) surrounded by a cladding layer such as cladding 36. One or more optional additional layers may be formed on cladding 36. Cladding 36 may have a refractive index lower than the refractive index of core 34 so that light in core 34 is guided along the length of core 34 (perpendicular the page of FIG. 2) in accordance with the principle of total internal reflection. In some arrangements, cladding 36 and/or a binder (e.g., transparent polymer or other clear material) may be used to join fibers 16F. The binder may have a lower index of refraction than cores 32. The refractive index of the binder may be lower than or equal to the refractive index of cladding 36 (as examples).

In some arrangements, layer 16 may include Anderson localization material. Anderson localization material is characterized by transversely random refractive index features (e.g., higher index regions and lower index regions or regions of three or more or four or more different respective refractive indices) with a lateral size of about 300-500 nm, at least 100 nm, at least 700 nm, at least 1 micron, less than 5 microns, less than 1.5 microns, two wavelengths, or other suitable lateral size that are configured to exhibit two-dimensional transverse Anderson localization of light (e.g., the light output from the display of device 10). These refractive index variations are longitudinally invariant along the direction of light propagation and are generally perpendicular to the surface normal of a layer of Anderson localization material (e.g., the refractive index variations have filamentary shapes that run from the lower input surface of layer 16 of FIG. 1 to the upper output surface of layer 16 of FIG. 1). In some configurations, the filaments in an Anderson localization material may be bent (e.g., along paths such as the paths followed by illustrative optical fibers 16F of FIG. 1).

Image transport layer material such as coherent fiber bundle material (and/or, if desired, Anderson localization material) can be used to form plates or other optical members such as layer 16. Illustrative configurations in which coherent fiber bundles are used in forming image transport layers are sometimes described herein as an example.

Image transport layers (e.g., plates or other members formed from coherent fiber bundles) may be layers with a thickness of at least 0.2 mm, at least 0.5 m, at least 1 mm, at least 2 mm, at least 5 mm, less than 20 mm, or other suitable thickness. Image transport layer material may also be used to form other structures (e.g., straight and/or bent elongated light pipes, spherical shapes, cones, tapered shapes, etc.). As shown in FIG. 1, the surfaces of image transport layers such a layer 16 may be planar and/or may have curved profiles (e.g., the edges of device 10 may have rounded outer surfaces). These surfaces may be formed by performing operations such as slicing operations, grinding operations, and polishing operations on blocks of image transport layer material.

The fiber cores, cladding, binder, and/or other structures in layer 16 may be formed from any suitable material such as polymer, glass, crystalline material such as sapphire, transparent ceramic, and/or other materials. Examples in which layer 16 is formed from polymer are sometimes described herein as an example. The polymer materials used in forming layer 16 may be amorphous polymers such as polymethylmethacrylate, polyester, polycarbonate, polyethylene terephthalate (e.g., glycol-modified polyethylene terephthalate), polystyrene, acrylic, or other glassy polymers and/or may be semicrystalline polymers such as fluoropolymers (e.g., THV, which is a terpolymer of tetrafluoroethylene, hexafluoropropylene and vinylidene fluoride, polyvinylidene fluoride, a terpolymer of ethylene, tetrafluoroethylene, and hexafluoropropylene, etc.).

In some arrangements, polymer material may be extruded to form extruded filaments (e.g., elongated strands of material). Extrusion of amorphous polymers may be performed at a temperature that is greater than the glass transition temperature of the amorphous polymer (e.g., at a temperature of at least 50° C. above the glass transition temperature of the polymer, which is about 105° C. for polymethylmethacrylate). Extrusion of semicrystalline polymers may be performed at a temperature of at least 30° C. above the melting point of the polymer (which is about 120-180° C. for THV and about 158° C. for polyvinylidene fluoride, as examples). During extrusion at elevated temperatures such as these, the polymer material is sufficiently soft to be relatively relaxed (low stress).

In an illustrative configuration, fiber cores such as fiber core 34 of FIG. 2 are formed from amorphous polymer having a glass transition temperature of at least 130° C., fiber cladding such as cladding 36 of FIG. 2 is formed from semi-crystalline fluoropolymer having a melting temperature of at least 120° C., and binder material for binding fibers 16F is formed from amorphous polymer having a glass transition temperature of less than 110° C. Extrusion operations may be performed at an elevated temperature such as a temperature of about 260° C., at least 220° C., at least 240° C., 220-300° C., etc. At this type of elevated temperature, the amorphous polymers are softened sufficiently to form a liquid and the cladding is liquid. The elevated temperature may be selected so that the viscosities of the polymers for the cores, cladding, and binder are similar in magnitude (e.g., these viscosities may be 200-450 Pa-s at a shear rate of 125/s and may have magnitudes that differ by less than 80%, less than 40%, less than 20%, less than 10%, or less than 5%, or less than 2.5% from each other (as examples). Polymer (e.g., binder and the materials used for forming fiber cores and claddings) can be extruded to form elongated strands (e.g., multi-core filaments, which may sometimes be referred to as extruded multi-core filaments, extruded filaments, multi-core extruded filaments, extruded multi-fiber strands, etc.). These multi-core filaments can subsequently be fused together in fusing tools to form image transport layer material. During fusion, the binder material of the multi-core filaments may join together to form a layer of binder containing embedded optical fibers 16F.

In an illustrative fusion arrangement, the fusion temperature is selected to be less than the glass transition temperature of the fiber core material and greater than the glass transition temperature of the binder material (e.g., about 115° C., which is 30° C. above a glass transition temperature of 85° C. for an illustrative binder polymer with an 85° C. glass transition temperature). This allows the cores to maintain their shape while the binder of different extruded filaments flows together. The fusion temperature may also be selected to be less than or equal to the melting temperature of the cladding polymer to help retain the cladding on the cores during fusion.

Figure 3:
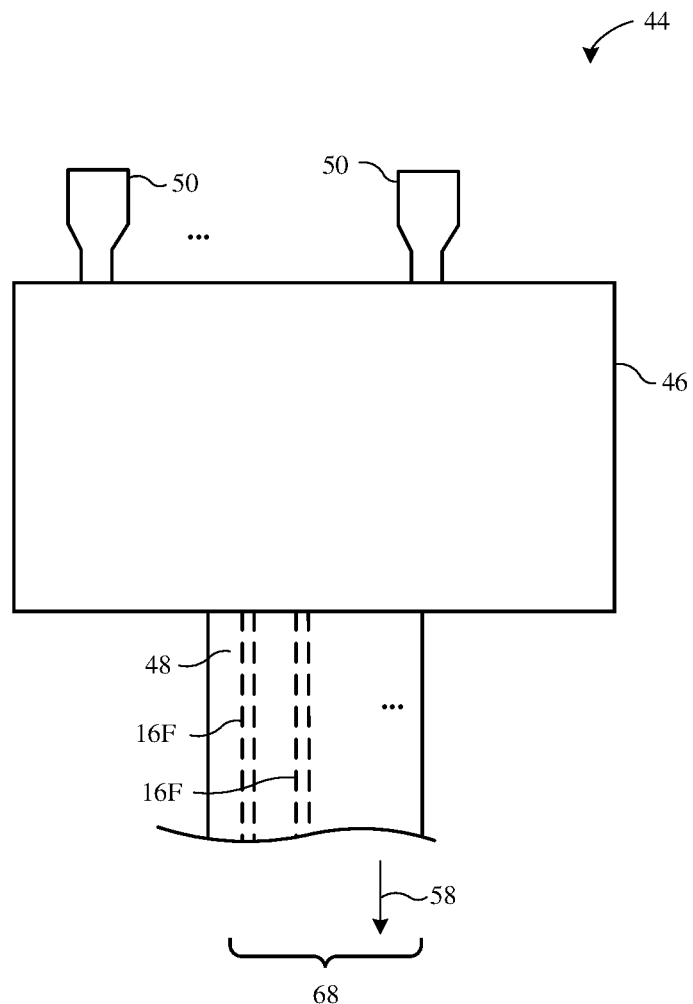
FIG. 3 is a side view of an illustrative extrusion tool for forming multi-core filaments in accordance with an embodiment.

An illustrative extrusion tool is shown in FIG. 3. As shown in FIG. 3, extruder 44 may include hoppers 50 that contain different types of material to be extruded (e.g., different polymers such as binder polymer, cladding polymer, and fiber core polymer). The material from hoppers 50 may be provided to coextrusion die set 46. During coextrusion, the material from hoppers 50 is coextruded through extrusion die set 46 and forms one or more elongated extruded members such as extruded filament 68, which exits extrusion die set 46 in direction 58. Extrusion die set 46 may include one or more layers with channels configured to distribute fiber core material into multiple cores surrounded by multiple cladding coatings, thereby forming multiple fibers 16F. The channels of extrusion die set 46 may be configured to embed fibers 16F in binder 48 during extrusion. Filaments such as filament 68 may have circular cross-sectional shapes and may contain any suitable number of fibers 16F (e.g., at least 3 fibers 16F, at least 10 fibers 16F, at least 30 fibers 16F, at least 100 fibers 16F, at least 500 fibers 16F, at least 2500 fibers 16F, less than 20,000 fibers 16F, less than 4000 fibers 16F, less than 500 fibers 16F, less than 100 fibers 16F, and/or other suitable number of fibers 16F).

When it is desired to join the polymer members from extruder 44 (e.g., extruded strands such as multi-core filament 68 of FIG. 3 or other elongated polymer members), the polymer members may be placed in fusion equipment, which fuses the polymer members by applying heat and pressure. In-line fusion tools (e.g., fusers with rollers), laser-fusion equipment, fusion equipment that involves wrapping filaments into channels using computer-controlled equipment that maintains desired angular orientations and tensions computer-controlled, and/or other illustrative fusing tools may be used to fuse filaments together to form image transport layer material.

A cross-sectional view of an illustrative fusion tool with a circular cross-sectional profile is shown in FIG. 4. As shown in FIG. 4, fusion tool (fuser) 60 may have multiple movable portions such as portion 62 and portion 64. These portions may be opened when it is desired to insert filaments 68 into opening 66. Filaments 68 may be multi-core filaments that each contain multiple fibers (e.g., multiple fiber cores coated with respective cladding layers) or other strands of material extending along the Z axis of FIG. 4 (e.g., in a scenario in which opening 66 forms an elongated cylindrical cavity with a longitudinal axis running parallel to the Z axis of FIG. 4. FIG. 5 shows how opening (cavity) 66 may have a hexagonal cross-sectional profile. FIG. 6 shows how opening (cavity) 66 may have a rectangular cross-sectional profile. Other shapes may be used for fusion equipment cavities, if desired.

Fusion tool 60 may be configured to support sequential or continuous fusion processes. In an illustrative configuration, filaments 68 are wound onto filament guiding channel structures such as channels in take-up equipment. These channels may be used in forming fusion tool 60. For example, the channels may have U-shapes and may form the lower wall and sidewalls of a rectangular fusion tool as shown by portion 62 of tool 60 of FIG. 6. An upper fusion tool wall (e.g., portion 64 of tool 60 of FIG. 6) may be formed from a separate member that is received within the U-shaped channel.

Figure 7:
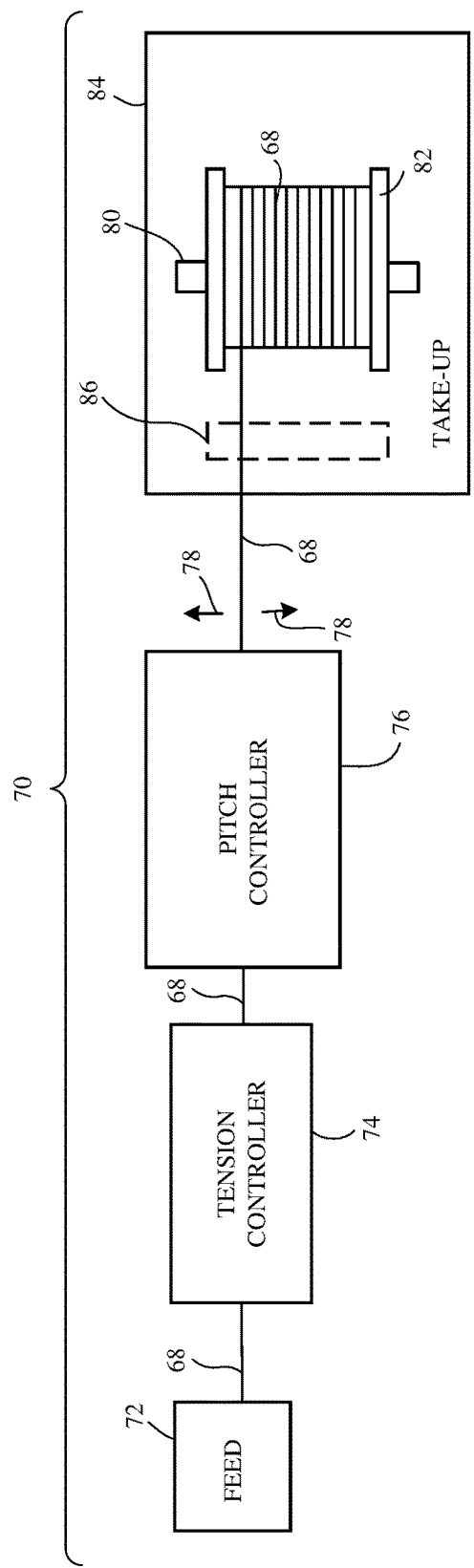
FIGS. 7 and 8 are diagrams of illustrative equipment for use in forming image transport layer material in accordance with embodiments.

An illustrative system for forming image transport layer material from multi-core filaments 68 is shown in FIG. 7. As shown in FIG. 7, system 70 may include a source of filaments 68 such as feed 72. Feed 72 may include one or more spools of filaments 68 produced by a source such as extruder 44 of FIG. 3. Filament(s) 68 from feed 72 may be provided to a tension control system such as tension controller 74 of FIG. 7. Tension controller 74 may include equipment for monitoring and controlling the tension of filament(s) 68. This equipment may include, for example, one or more rollers around which filament(s) 68 pass while traveling towards take-up 84, speed sensors coupled to the rollers, a tension sensor that is biased against filament(s) 68 to measure (from a force measurement) how much tension is present in filament(s) 68, and a tension adjustment system (e.g., a set of rollers where one or more rollers may be displaced relative to the other rollers using a computer-controlled actuator and/or roller(s) where roller rotational speed is adjusted with a computer-controlled motor so that slack may be taken up and/or tension may be relieved as appropriate). During operation, tension controller 74 may make measurements on the state of filament(s) 68 (e.g., real-time filament tension measurements) and may, based on this tension information, control the tension adjustment system to maintain a desired tension level in filament(s) 68 (e.g., by adjusting roller position and/or roller speed). In this way, tension variations can be maintained under a desired threshold level. For example, the tension of filament(s) 68 may be sufficiently well controlled to ensure that the tension of 99.9% of filament(s) 68 in the image transport layer being formed varies by less than 5%, less than 4%, less than 3%, less than 2%, or less than 1% from a given amount of tension (as examples).

After passing through tension controller 74, filament(s) 68 may pass through a computer-controlled filament position controller such as pitch controller 76. Pitch controller 76 may have rollers that form a guide that is positioned dynamically along directions 78 (e.g., directions extending orthogonal to the length of filament(s) 68) by a computer-controlled actuator. Filament(s) 68 pass through the guide. Take-up 84 may contain a take-up spool such as spool 82 that rotates about axle 80. The sidewalls of spool 82 may form a channel-shaped recess that forms part of a fusion tool (see, e.g., portion 62 of tool 60 of FIG. 6). As filament(s) 68 is wound onto spool 82, pitch controller 76 controls the position of filament(s) 68 along directions 78. In this way, controller 76 helps ensure that wraps of filaments 68 are evenly wound onto spool 82.

The position of filament(s) 68 may be measured in real time using an optical sensor or other sensor (see, e.g., machine vision sensor 86 of FIG. 7). This filament position sensor may form part of the take-up system of system 70 (e.g., part of take-up 84 of system 70). During operation, pitch controller 76 may be adjusted to control the location of filament(s) 68 based on information from the filament position sensor. Accurate control of the filament position allows the angular orientation of filament(s) 68 to be accurately controlled. As a result, angular orientation variations can be maintained at an acceptably low level.

Figure 8:
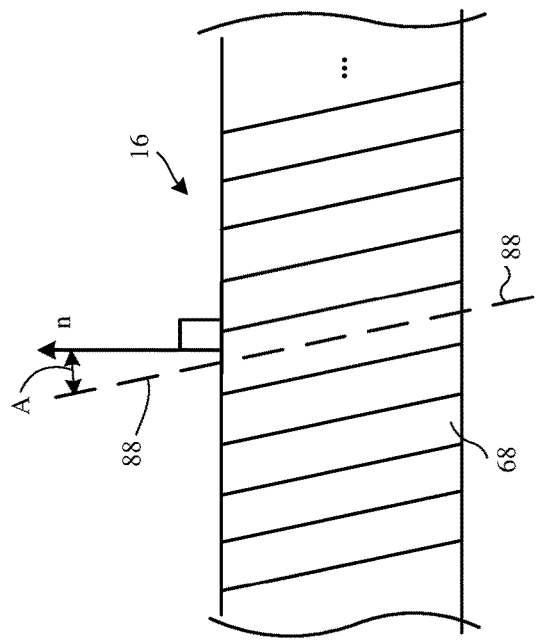

Consider, as an example, the cross-sectional side view of image transport layer 16 of FIG. 8. As shown in FIG. 8, due to variations in the position of filament(s) 68 during winding onto take-up 84 (and due partly to alignment tolerance issues when polishing image transport layer 16), filaments 68 (and fibers 16F within filaments 68) may extend along directions (e.g., longitudinal axes 88) that are oriented at a non-zero angle A with respect to surface normal n of the surface of image transport layer 16. In a given image transport layer, each of fibers 16F may have an associated orientation angle A. By using feedback from position sensor 86 to accurately control pitch controller 76, the distribution of angle A for fibers 16F can be limited.

Figure 9:
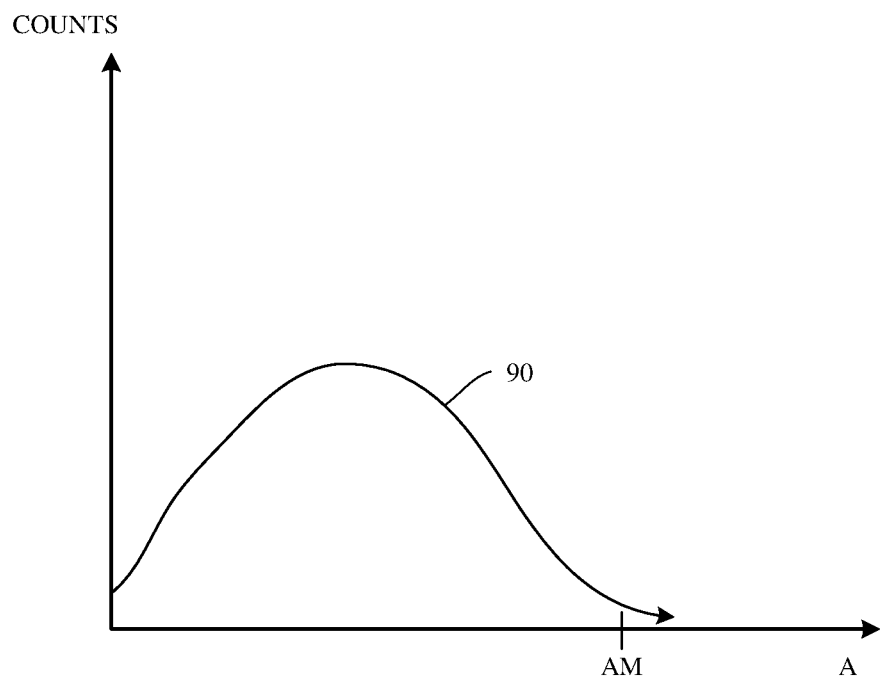
FIG. 9 is a graph showing an illustrative angular distribution of fibers in an image transport layer in accordance with an embodiment.

FIG. 9 is a graph showing the number of fibers 16F or filaments 68 present in an illustrative image transport layer formed by system 70 as a function of angular orientation A. As shown in FIG. 9, almost all fibers 16F (filaments 68) have angles A that are less than a suitable maximum angle AM due to accurate position control in system 70 that is achieved from the use of pitch controller 76. In an illustrative embodiment, the value of AM is 0.5° and the fraction of fibers 16F (and filaments 68) with angles A of less than AM (e.g., of angles A between 0° and) 0.5° is at least 99.5%, at least 99.9%, or at least 99.99% (as examples).

To ensure that image transport layer 16 exhibits satisfactory optical quality and does not produce unclear images at its output surface, system 70 preferably controls filament tension within a suitable given amount (e.g., so that there is less than 2% or less than 1% tension variation between respective filaments and between respective fibers) and preferably controls fiber angular orientation in the block of image transport layer material produced using system 70 so that at least 99.5%, at least 99.9%, or at least 99.99% of angles A are less than a suitable value of maximum angle AM (e.g., 0.5°). By ensuring that the fibers and filaments in layer 16 (e.g., 100% or 99.9% or other suitable fraction of the fibers and filaments) have less than the given amount of tension variation and by ensuring that a suitable fraction of angular orientations A in layer 16 are below a desired amount (e.g., 0.5° or other given angle), clear images may be produced at the output surface.

Figure 10:
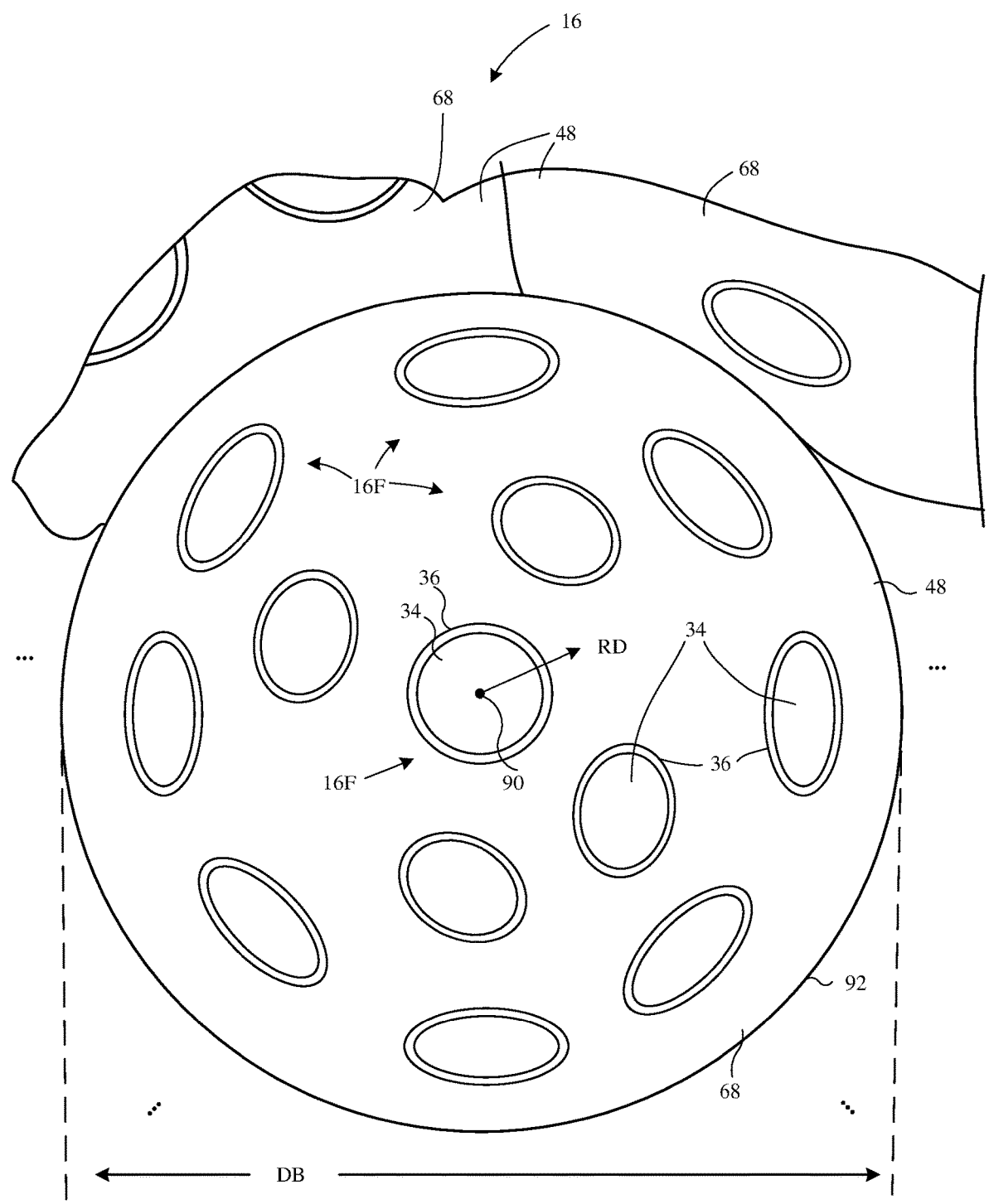
FIG. 10 is a cross-sectional view of a portion of an image transport layer having fused multi-core filaments in accordance with an embodiment.

FIG. 10 is a cross-sectional view of a portion of an illustrative image transport layer 16 that has been formed by fusing extruded multi-core filaments 68 together while maintaining filament tension and angular orientation within satisfactory limits. During filament fusion, binder 48 from multiple filaments 68 fuses together and helps hold filaments 68 together. This forms a block of image transport layer material where multiple fibers 16F are embedded in the binder. Subsequent processing operations (e.g., molding to deform fibers 16F, polishing, etc.) may be performed to form a desired final version of image transport layer 16.

The maximum lateral dimension (e.g., diameter DB) of each filament 68 may be about 50-300 microns (e.g., at least 30 microns, at least 50 microns at least 100 microns, less than 600 microns, less than 500 microns, less than 300 microns, less than 150 microns, or other suitable diameter). The maximum lateral dimensions (e.g., the diameters) of fibers 16F may be about 3-15 microns (e.g. at least 2 microns, at least 3 microns, at least 5 microns, less than 30 microns, less than 25 microns, less than 15 microns, less than 10 microns, or other suitable fiber diameter). In the example of FIG. 10, fibers 16F have fiber cores 34 and fiber claddings 36. The thickness of cladding 36 may be about 0.5 to 2 microns (e.g., at least 0.3 microns, at least 0.5 microns, at least 0.9 microns, less than 4 microns, less than 2 microns, less than 1.5 microns, etc.).

Fibers 16F in filaments 68 may become deformed (e.g., fibers 16F may exhibit non-circular cross-sectional shapes) during the extrusion process used in forming multi-core filaments 68. In particular, as filaments 68 are extruded by extruder 44 of FIG. 3, filaments 68 may be subjected to surface tension and fluid dynamics effects (e.g., shear forces that arise because the central portions of filaments 68 flow out of extruder 44 with a greater velocity than peripheral portions of filaments 68). As a result, near center 90 of each filament 68 exiting extruder 44, fibers 16F are perfectly or near perfectly circular in shape (e.g., the eccentricity e of fibers 16F is 0-0.3 as an example), whereas near the periphery of filament 68, fibers 16F are deformed and are not perfectly circular (e.g., the eccentricity e of fibers 16F is 0.5-0.99 as an example). These shape attributes are generally preserved during fusion of the extruded filaments to form layer 16.

As shown in FIG. 10, fibers 16F may be characterized by increasingly deformed shapes (e.g., fibers 16F may be increasingly less circular) as a function of increasing radial distance RD from filament center 90 to filament periphery 92. As shown in FIG. 10, this general behavior, in which fibers 16F have cross-sectional shapes that are more deformed at filament peripheries 92 than at filament centers 90, is exhibited even after filaments 68 are fused together (and the outlines of filaments 68 are themselves distorted) to form image transport layer 16. Although image transport layers formed by fusing multiple extruded multi-core filaments together have filament-sized areas that exhibit radially increasing fiber shape deformation (e.g., the fibers have amounts of lateral deformation that increase as a function of increasing radial distance from the center of the filament in which the fibers are contained), satisfactory high-quality images can be transported through the image transport layers due to the tension control and angular orientation control maintained by system 70.

Illustrative system 70 of FIG. 7 uses tension controller 74 and pitch controller 76 in controlling tension and angular orientation variations when forming image transport layer material. In general, equipment for forming image transport layer material may include other devices and/or other techniques may be used to help limit tension variations and angular orientation variations. If desired, pitch control can be synchronized with take-up rotation to help achieve dense filament packing. Feed 72 may include one or more spools of filament 68 and may, if desired, include tension controllers such as tension controller 74. In some configurations, tension control devices may be placed at one or more locations along the lengths of filaments 68. Guide structures (e.g., a guide board with an array of openings for guiding respective filaments) may be interposed at one or more locations between feed 72 and spool 82. To ensure that filaments 68 do not unwrap from the channel guides in spool 82 after winding (and loss of tension), fusion operations may be performed in system 70 while filaments 68 are under tension. An autoclave or other heat source may, if desired, heat all of spool 82 (e.g., to fuse filaments in all of the channel structures supported around the periphery of spool 82). In some configurations, in-line welding (e.g., with a laser or other heat source) may be used to lock in filament-to-filament alignment. In-line bundling of filaments (e.g., to fuse multiple sets of filaments into canes that are subsequently fused together) may also be used. In some configurations, sheets of filaments 68 may be fused by passing multiple filaments through a set of rollers while heating the filaments. In-line fusion arrangements may involve application of heat and pressure during winding of filaments 68 onto spool 82. For example, a hot roller or infrared light may be applied to the outer surface of a layer of wound filaments to help fuse those filaments in place during the winding process. These techniques and/or other techniques may be used in addition to or instead of the techniques for forming image transport layer material described in connection with FIG. 7 and may help ensure that image transport layer 16 has desired properties (e.g., sufficiently controlled tension variations and/or angular orientation variations to ensure good optical quality when image transport layer 16 is used in device 10).

As described above, one aspect of the present technology is the gathering and use of information such as sensor information. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

The foregoing is merely illustrative and various modifications can be made to the described embodiments. The foregoing embodiments may be implemented individually or in any combination.

What is claimed is:

1. An electronic device, comprising:
a housing;
a display in the housing; and
an image transport layer that overlaps the display, wherein the image transport layer has an input surface configured to receive an image from the display and an output surface to which the image is transported from the input surface, wherein the image transport layer comprises a plurality of fused extruded filaments, and wherein each extruded filament contains multiple optical fibers.

2. The electronic device defined in claim 1 wherein each extruded filament contains binder in which the multiple optical fibers of that extruded filament are embedded.

3. The electronic device defined in claim 2 wherein each optical fiber comprises an optical fiber core surrounded by a cladding.

4. The electronic device defined in claim 3 wherein each extruded filament contains at least ten of the optical fibers.

5. The electronic device defined in claim 4 wherein each extruded filament has a maximum lateral dimension of at least 30 microns and less than 500 microns.

6. The electronic device defined in claim 5 wherein each of the optical fibers has a maximum lateral dimension of at least 2 microns and less than 25 microns.

7. The electronic device defined in claim 2 wherein the binder comprises polymer.

8. The electronic device defined in claim 1 wherein the optical fibers within each extruded filament are characterized by increasing lateral deformation as a function of increasing radial distance from a center of that extruded filament.

9. The electronic device defined in claim 1 wherein at least 99.9% of the filaments in the image transport layer have angular orientations that deviate by less than 0.5° from a given angular orientation.

10. The electronic device defined in claim 1 wherein at least 99.9% of the filaments in the image transport layer have tensions that vary by less than 2% from a given amount of tension.

11. An electronic device, comprising:
a display configured to produce an image; and
a coherent fiber bundle layer that overlaps the display and that is configured to receive the image at an input surface and to transport the received image to an output surface, wherein the coherent fiber bundle has a plurality of extruded filaments, each extruded filament having an elongated strand of binder and multiple optical fibers embedded within the binder.

12. The electronic device defined in claim 11 wherein the binder comprises an amorphous polymer binder.

13. The electronic device defined in claim 12 wherein within each extruded filament the multiple optical fibers are characterized by increasing lateral deformation as a function of increasing radial distance from a center of that extruded filament.

14. The electronic device defined in claim 13 wherein each optical fiber has a fiber core formed of amorphous polymer surrounded by a cladding formed of semicrystalline polymer.

15. The electronic device defined in claim 11 wherein the extruded filaments each contain at least ten of the optical fibers.

16. The electronic device defined in claim 15 wherein the plurality of extruded filaments are fused together so that the binder of the extruded filaments forms a layer in which the optical fibers are embedded.

17. The electronic device defined in claim 11 wherein each extruded filament has a maximum lateral dimension of at least 30 microns and less than 500 microns.

18. The electronic device defined in claim 17 wherein each of the optical fibers has a maximum lateral dimension of at least 2 microns and less than 25 microns.

19. The electronic device defined in claim 11 wherein at least 99.9% of the filaments in the coherent fiber bundle have angular orientations that differ by less than 0.5° from a given angular orientation and wherein at least 99.9% of the filaments in the coherent fiber bundle have tensions that differ by less than 2% from a given amount of tension.

20. An electronic device, comprising:
   a display configured to produce an image; and
   a coherent fiber bundle layer that overlaps the display and that is configured to receive the image at an input surface and to transport the received image to an output surface, wherein the coherent fiber bundle has a plurality of extruded strands of binder each of which includes multiple optical fibers with non-circular cross-sectional shapes.

21. The electronic device defined in claim 20 wherein the plurality of extruded strands of binder are fused together to form a binder layer in which the optical fibers are embedded, wherein the optical fibers each have a fiber core covered with a cladding, and wherein the multiple optical fibers within each extruded strand are characterized by increasing lateral deformation as a function of increasing radial distance from a center of that extruded strand.

* * * * *